UNITED STATES PATENT OFFICE.

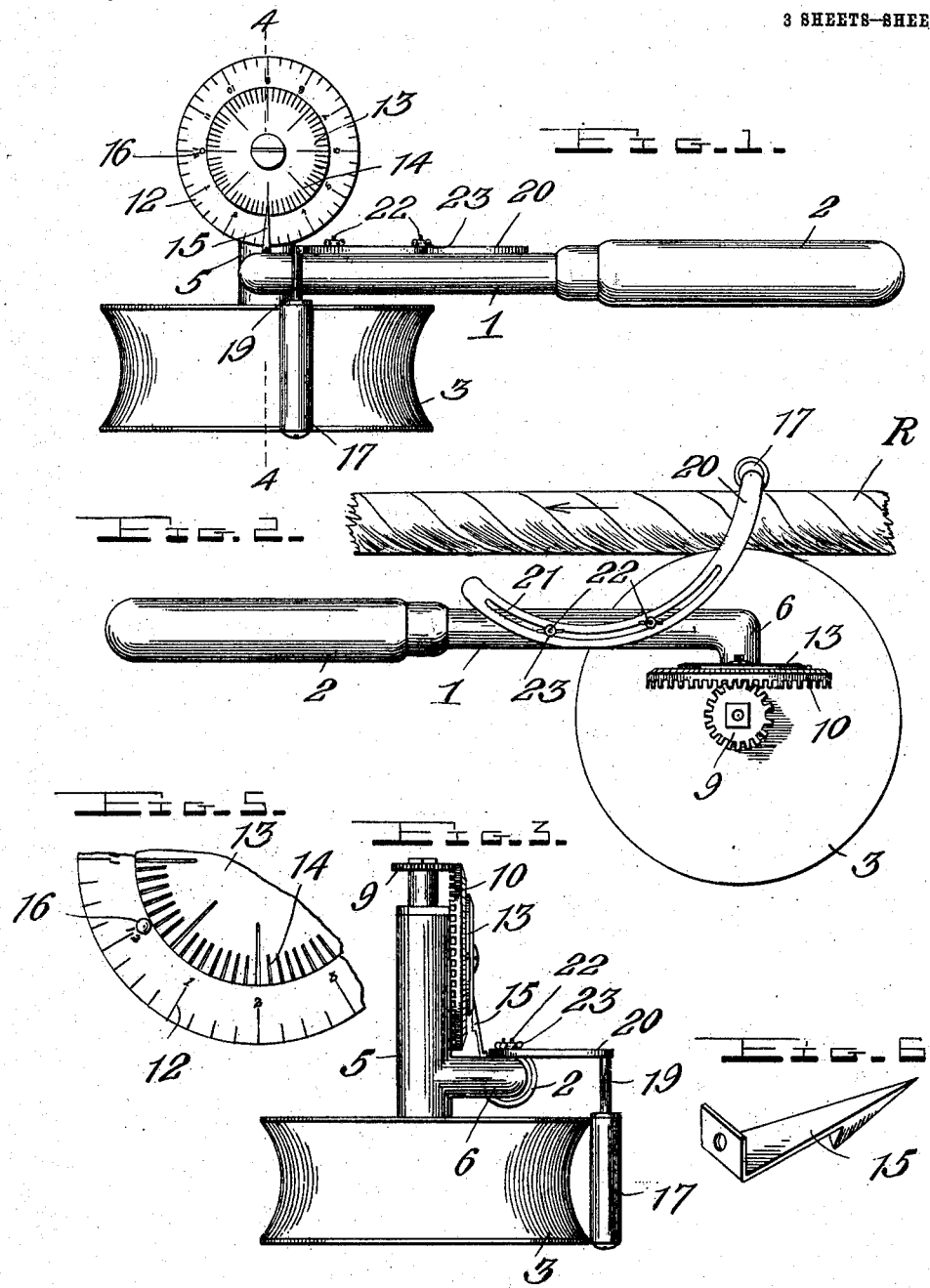

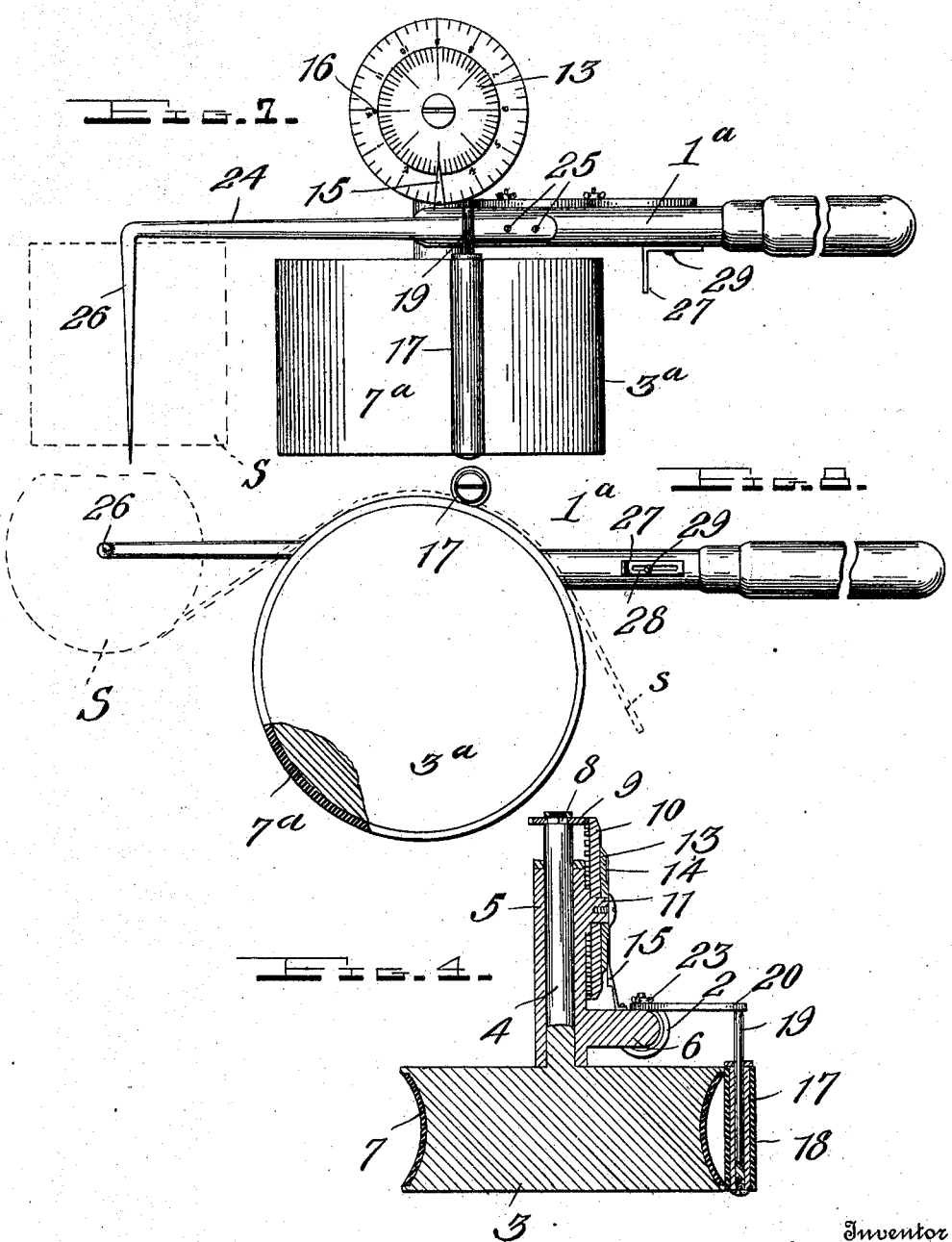

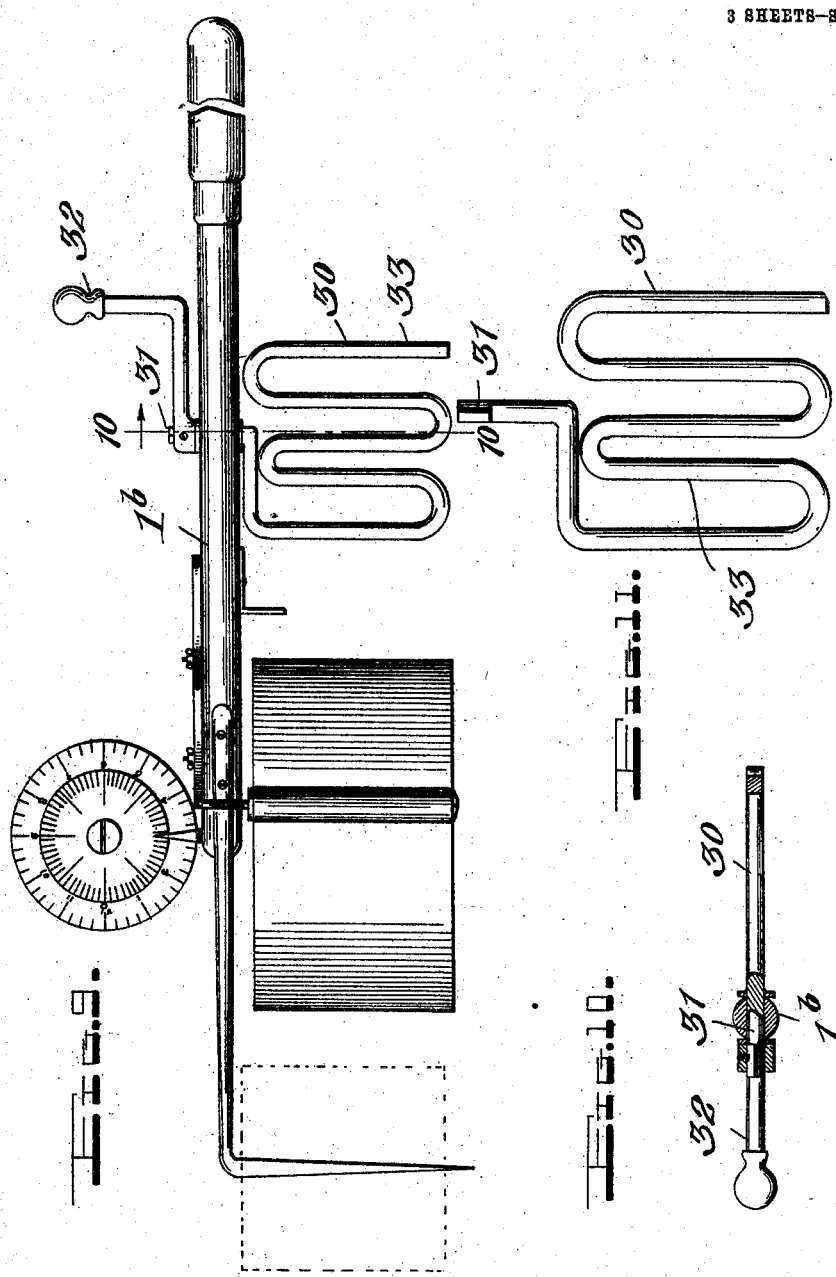

THOMAS M. HOUSE, OF WELDON, NORTH CAROLINA.

MEASURING DEVICE.

981,086.  Specification of Letters Patent.  Patented Jan. 10, 1911.

Application filed January 25, 1910. Serial No. 539,988.

*To all whom it may concern:*

Be it known that I, THOMAS M. HOUSE, a citizen of the United States, residing at Weldon, in the county of Halifax and State of North Carolina, have invented certain new and useful Improvements in Measuring Devices, of which the following is a specification, reference being had to the accompanying drawings.

My invention relates to improvements in measuring devices, and more particularly those designed for measuring rope, ribbon, cloth and the like.

The principal object of the invention is to provide a simple and practical hand tool which may be conveniently and effectively used for measuring rope, ribbon or the like; which has an improved indicating or registering device, and an improved means for supporting and guiding the material to be measured.

With the above and other objects in view, the invention consists of the novel construction, combination and arrangement of parts, hereinafter fully described and claimed, and illustrated in the accompanying drawings in which:—

Figure 1 is a plan view of a measuring device constructed in accordance with my invention and especially adapted for measuring rope, cable etc.; Fig. 2 is a side view of the device; Fig. 3 is an end view; Fig. 4 is a sectional view taken on the general plane indicated by the broken line 4—4 in Fig. 1, parts also being broken away and in section; Fig. 5 is an enlarged detail view of portions of the indicating dials; Fig. 6 is an enlarged perspective view of the spring indicating and dial retaining finger; Fig. 7 is a view similar to Fig. 1 showing a slightly modified form of the invention which is adapted for measuring ribbon, cloth, or the like; Fig. 8 is a side view of the device shown in Fig. 7 with parts broken away and in section. Fig. 9 is a view similar to Figs. 1 and 7 showing a slightly modified form of the invention adapted for measuring ribbon or the like and provided with means for winding up the ribbon as it is measured. Fig. 10 is a detail section taken on the plane indicated by the line 10—10 in Fig. 9; and Fig. 11 is a detail view of the rotary winding reel.

Referring more particularly to the drawings, 1 denotes a body or support which when the device is in the form of a hand tool may be constructed of a cylindrical bar or rod as shown and have a suitable hand grip 2 at one of its ends. The other or outer end of the body 1 carries a rotary measuring wheel 3 which as illustrated is carried by a rotary shaft or pivot 4 mounted in a bearing sleeve 5 arranged transversely on the right angularly bent outer end 6 of the body, see Figs. 2 and 4. The measuring wheel 3 may be variously constructed according to the use which the tool is designed to serve, but when said tool or device is to be used for measuring rope or the like, its periphery is grooved or of concave shape in cross section as indicated in Figs. 1 and 3, and said periphery is also preferably covered with rubber 7 or other material which will lessen the liability of the rope slipping.

Fixed to the shaft 4, preferably as indicated at 8 in Fig. 4, is a pinion 9 which meshes with a crown gear 10 rotatable on a pivot stud 11, as clearly shown in said Fig. 4. The outer face of the crown wheel or gear 10 forms a dial which is graduated in any suitable manner, the units being inches and fractions thereof, as indicated at 12. Arranged on top of the gear or dial 10 and on the pivot 11 is a second dial or disk 13, the outer edge of which is likewise graduated as indicated at 14. The graduations 14 are adapted to indicate the number of revolutions of the gear or dial 10 and they coact with a spring pointer or finger 15 which is carried by the angular end 6 of the body and is also adapted to retain the disk or dial 13 against rotary motion except when said finger is retracted by a cam projection or enlargement 16 arranged on the gear or dial 10. It will be noted that each time the latter makes a complete revolution the projection or cam 16 will strike the spring finger 15 and lift the latter out of engagement with one of the graduated grooves 14, whereupon the disk or dial 13 will move with the gear or dial 10 by reason of its frictional contact therewith, the dial 13 being thus moved the distance of one graduation on each revolution of the gear or dial 10 so that the former indicates the number of revolutions made by the latter.

If desired, I may provide means for holding the cable or other material that is to be measured in contact with the measuring wheel 3 during the measuring operation. One embodiment of such retaining and guiding means is illustrated in the drawings and consists of a roller 17, the periphery of which may be covered as at 18 with rubber or other suitable material to prevent slipping of the rope. The roller 17 is rotatable on a shaft or arm 19 which projects at right angles from one end of a longitudinally curved or arc-shaped supporting and adjusting member 20. The latter is in the form of a bar and its mounting and adjustment is effected by forming in it a longitudinal slot 21 which receives two screw studs 22 projecting from the body bar 1 and having at their outer ends wing nuts 23 for clamping the bar 20 in adjusted position on the body 1. It will be seen that by mounting the support for the roller in this manner the latter may be adjusted toward or from the measuring wheel 3, according to to the size and nature of the material that is measured by the device.

In Figs. 7 and 8 of the drawing I have shown a slightly modified form of the invention which is more especially adapted for measuring ribbon, cloth or other sheet material. In this embodiment of the invention the body $1^a$ carries a measuring wheel $3^a$ of cylindrical form and having a flat periphery covered with rubber or other material $7^a$. In order to hold a bolt of ribbon or the like which is to be measured I provide the body $1^a$ with a supporting device 24. This device is in the form of a bar arranged to project longitudinally from the outer end of the body bar $1^a$ and having one end secured thereto by screws or other removable fastenings 25. The other end of the bar or support 24 is bent at right angles and tapered to form a pin 26 which may be forced into a spool of ribbon or the like to serve as a journal on which such spool or bolt can rotate. In this embodiment of the invention I may also use a guide 27 for the ribbon or other material. This guide is shown in the form of a right angular plate having one end projecting at right angles of the body bar $1^a$, and its other end longitudinally slotted as at 28 to receive a clamping screw 29.

In Figs. 9 to 11 inclusive of the drawings I have shown the ribbon or tape measuring device set forth in Figs. 7 and 8 provided with an extended body $1^b$ on which is arranged adjacent the handle a rotary member or reel 30 on which the ribbon or the like is adapted to be wound as it comes from the measuring wheel. This rotary member 30 may be of any form and construction but as illustrated it comprises a transverse pivot 31 rotatable in the body $1^b$ and having at one end a crank handle 32 and at its other end a flat head or reel 33 on which latter the ribbon is wound. The head 33 and its pivot 31 are preferably formed from a single piece of heavy wire or metal rod suitably bent, the head or reel 33 being constructed by bending the piece back and forth upon itself so that the ribbon may be passed between its bends or folds to start it on the device. Owing to the provision of this winding attachment it will be seen that the ribbon as it is unwound from the spool and passed over the measuring wheel will be wound upon the head or reel 33 so that after the desired amount of ribbon has been measured and cut it may be removed from the device or wound up or folded and ready to be placed in an envelop or package, the device therefore saving considerable time and labor on the part of clerks in stores.

In operation, when the form of the invention in Figs. 1, 2 and 3, of the drawing is to be used for measuring rope, the latter which is indicated at R in Fig. 2, is placed between the measuring wheel 3 and the retaining and guiding roller 17, and the rope and device are then moved relatively to each other to cause the wheel 3 to rotate. This rotary movement of the measuring wheel is imparted through the meshing gears 9, 10, and other parts to the indicating disk or dial 13.

In the use of the modification shown in Figs. 7 and 8, it will be understood that the spool or bolt of ribbon which is indicated in dotted lines at S is applied to the journal pin 26 and the ribbon $s$ is then passed between the wheel or drum $7^a$ and the retaining roller, as indicated in dotted lines in Fig. 8.

In the use of the modification shown in Figs. 9 to 11 it will be understood that after the ribbon spool has been applied to its support and the end of the ribbon passed between the measuring or retaining rollers, said end is engaged with the rotary head or reel and the handle 32 is then rotated to wind the desired amount of ribbon thereon, the amount being indicated by the indicating mechanism as will be readily understood.

While I have shown and described in detail the preferred embodiments of the invention, it will be understood that I do not wish to be limited to the precise construction set forth, since various changes in the form, proportion and arrangement of parts, and in the details of construction, may be resorted to within the spirit and scope of the invention.

Having thus described the invention what is claimed is:

1. In a measuring tool, the combination of a body composed of long and short arms arranged at right angles to each other, its long arm being provided with a hand grip, and its short arm formed with a transverse tubular bearing, a shaft rotatable in said bearing, a measuring wheel fixed on one end of said shaft, a toothed wheel fixed to the other end of said shaft, a second toothed wheel journaled on one side of said tubular bearing and arranged to mesh with the first mentioned toothed wheel, said second toothed wheel being provided on its outer face with graduation marks, a rotary indicating disk arranged concentric with said second toothed wheel and in frictional contact therewith, said disk being provided on its outer face with an annular series of radially arranged grooves forming scale graduations, a spring indicating and retaining finger secured to the short arm of the body of the tool and having its free end beveled to engage the grooves in said disk, and a cam projection carried by said second toothed wheel and adapted to retract said finger.

2. In a measuring device, the combination of a body, a rotary measuring wheel, an indicating device actuated from said wheel, a handle upon said body, screw studs on said body, a bar having a longitudinally extending arc-shaped slot to receive said screw studs, wing nuts on said screw studs for clamping said bar in adjusted position, and a roller carried by said bar and opposed to the periphery of said wheel, for the purpose set forth.

3. In a measuring tool, the combination of a body composed of long and short arms arranged at right angles to each other and having a hand grip on the long arm and a transverse tubular bearing on the short arm, a shaft journaled in said bearing, a measuring wheel carried by said shaft, an indicating device carried by the body and actuated from said shaft, and a ribbon spool supporting member having an inner end fixed to the long arm of the body and projecting longitudinally therefrom, said member also having an outer end tapered longitudinally to a point and projecting at right angles to the inner end and parallel with said shaft, whereby a paper ribbon spool or drum may be readily applied to or removed from said pointed outer end of the spool supporting member.

4. In a measuring tool, the combination of a body composed of long and short arms arranged at right angles to each other and having a hand grip on the long arm and a transverse tubular bearing on the short arm, a shaft journaled in said bearing, a measuring wheel carried by said shaft, an indicating device carried by the body and actuated from said shaft, a right angular ribbon spool support having one end secured to the long arm of the body and projecting longitudinally therefrom, and a short tapered arm to receive a paper ribbon supporting spool, means on the body for holding ribbon against said measuring wheel, and the right angular slotted gage 27 secured to the intermediate portion of the long arm of the body.

5. In a measuring tool, the combination of a body composed of long and short arms arranged at right angles to each other and having a hand grip on the long arm and a transverse tubular bearing on the short arm, a shaft journaled in said bearing, a measuring wheel carried by said shaft, an indicating device carried by the body and actuated from said shaft, a right angular ribbon spool supporting member having one end secured to the long arm of the body and projecting longitudinally therefrom and its other end tapered to receive a paper ribbon supporting spool, means on the body for pressing ribbon against said measuring wheel, a ribbon-winding wheel formed by bending a metal rod back and forth upon itself to form a flat head composed of spaced parallel bars adapted to receive ribbon between them, one end of said rod being bent into right angular shape to form a pivot and being rotatable in the intermediate portion of the body of the tool, and a crank handle fixed to the projecting end of said pivot.

In testimony whereof I hereunto affix my signature in the presence of two witnesses.

THOMAS M. HOUSE.

Witnesses:
R. W. PARRISH,
J. G. DUVAL.